United States Patent [19]

Urbani

[11] Patent Number: 4,687,584

[45] **Date of Patent: * Aug. 18, 1987**

[54] SLUDGE REMOVER AND PROCESSOR

[75] Inventor: William G. Urbani, Stockton, Calif.

[73] Assignee: Industrial Innovations, Inc., Stockton, Calif.

[ * ] Notice: The portion of the term of this patent subsequent to Aug. 21, 2001 has been disclaimed.

[21] Appl. No.: 767,007

[22] Filed: Aug. 19, 1985

[51] Int. Cl.⁴ .............................................. B01D 45/12

[52] U.S. Cl. .................................. 210/769; 210/776; 210/781; 210/804; 210/805; 210/806; 210/808; 210/194; 210/258; 210/297; 210/360.1; 210/525

[58] Field of Search ............... 210/294, 776, 297, 167, 210/767, 194, 787, 197, 781, 195.1, 768, 251, 769, 258, 800, 259, 804, 260, 805, 261, 808, 262, 360.1, 369, 380.1, 513, 525, 538, 540, 541, 542

[56] References Cited

U.S. PATENT DOCUMENTS

| | | | |
|---|---|---|---|
| 1,176,774 | 3/1916 | Morris . | |
| 2,139,096 | 12/1938 | Piquerez . | |
| 2,834,359 | 5/1955 | Kearney . | |
| 2,860,785 | 11/1958 | Gardner . | |
| 3,262,571 | 7/1966 | Petretti | 210/297 |
| 3,447,545 | 6/1969 | Lawter . | |
| 3,502,215 | 3/1970 | Cahan . | |
| 4,053,399 | 10/1977 | Donnelly et al. | 210/297 |
| 4,134,174 | 1/1979 | Flynn et al. . | |
| 4,192,746 | 3/1980 | Arvanitakis | 210/297 |
| 4,416,767 | 11/1983 | Jordan | 210/781 |
| 4,466,154 | 8/1984 | Urbani . | |
| 4,530,131 | 7/1985 | Zell et al. . | |

OTHER PUBLICATIONS

Oliver, J. T., Western Electric Technical Digest No. 37, pp. 19–20, Jan. 1975.

*Primary Examiner*—Frank Sever

*Attorney, Agent, or Firm*—Townsend and Townsend

[57] ABSTRACT

A sludge remover and processor includes a first vessel holding cleaning liquid and a second, phase separating vessel. Cleaning liquid from the first vessel is sprayed against a dirty surface. A vacuum pump keeps the second vessel upper region at a partial vacuum so cleaning liquid and dislodged matter from the dirty surface is sucked into the second vessel. Solids and liquid are pumped from the second vessel into a solids separator where the larger solids are removed for disposal and liquid is pumped into a centrifuge which removes fine solid particles. The fine particles are mixed with a bulk solidification medium for disposal. Oil collection in the vessels is enhanced by the partial vacuum which lowers the boiling point so tiny bubbles are formed to aid separation of the oily and non-oily phases. Passing the liquid through a centrifuge also aids separation of the oily and non-oily phases in the first vessel.

21 Claims, 1 Drawing Figure

SLUDGE REMOVER AND PROCESSOR

BACKGROUND OF THE INVENTION

The invention is related to cleaning systems, in particular one which is suited for cleaning heavily soiled surfaces, particularly tanks, vats and other containers.

Many industrial containers, including truck tankers, railroad tank cars and stationary tanks and vats, must be cleaned, usually after the tank is empty, to remove any material or contaminants left on the container surfaces. To do so, the surfaces to be cleaned are usually sprayed with a high pressure cleaning liquid to dislodge the contaminants, both liquid and solid, from the surfaces. Because the impact of the high pressure spray is diffused if there is a liquid layer within the tank, it is desirable to keep the amount of cleaning liquid which gathers at the bottom of the tank to a minimum. This is preferably done by constantly removing the cleaning liquid and dislodged contaminants.

The cleaning liquid and dislodged contaminants may both be liquid. However, the mixture is often a sludge containing liquids, viscous materials and solids. Some type of containers, such as oil tankers, pose special problems for tank cleaning apparatus. Oil pumped out of the ground contains rocks, sand and gravel. In addition to this naturally occurring foreign matter, a great number of rags find their way into oil holding compartments of oil tankers. The presence of contaminants which both float and sink create additional problems during cleaning operations. What has been missing from the prior art is a mobile cleaning unit capable of efficiently removing and processing multi-component sludge.

SUMMARY OF THE INVENTION

The invention is directed to a sludge remover and processor which is sufficiently compact to allow it to be mobile and thus moved to the tank or other surface to be cleaned and yet can accommodate sludge having large and small solids, oily liquids and other material.

The sludge remover and processor includes a first vessel holding a supply of cleaning liquid and a second, phase separating vessel. Cleaning liquid is pumped from the first vessel through a heat exchanger and then through a spray nozzle where it is directed against the dirty surface of the vat, tank or other surface to be cleaned. A vacuum pump maintains the region above the free surfaces in the first and second vessels at a partial vacuum.

The liquid and dislodged matter is removed from the dirty tank by a return line having an inlet at a low point where the cleaning liquid and dislodged material collect. The other end of the return line is connected to the upper region of the second vessel so the cleaning liquid and dislodged contaminants are drawn into the second vessel through the action of the partial vacuum.

The cleaning liquid and dislodged material pass through a phase separator in the second vessel which aids separating the oily phases from the non-oily phases and solids from the liquids as well.

The bottom of the second vessel is coned so that the solids and liquid are pumped from the second vessel into a solids separator where the larger solids are removed for disposal. The liquid is pumped from the solid separator into a centrifuge which removes the fine solid particles from the liquid. The fines are mixed with a bulk solidification medium in a blender/extruder for disposal as disposal cake.

The liquid from the centrifuge flows into a liquid collector pot. The liquid in the liquid collector pot is sucked into the first vessel by the action of the partial vacuum in the space above the surface of the cleaning liquid. An oil skimmer is used in both vessels to remove oil collecting therein.

The exhaust from the vacuum pump can be directed back into the dirty tank, assuming it is a closed vessel, so that the system remains a closed system, or it can be directed to an exhaust scrubber. The scrubber condenses out condensable liquids for collection in a second liquid collector. Liquid in the second liquid collector is returned to the second vessel through the partial vacuum in the upper region of the second vessel. The gas exiting the scrubber is fed to the burner of the heat exchanger where it is burned.

Oil collection is enhanced by maintaining the cleaning liquid at a reduced pressure in the first and second vessels which lowers the boiling point of the liquid. This allows tiny bubbles to form in the liquid which aids separation of the oily from the non-oily phases. Passing the liquid through the centrifuge, in addition to removing solids much smaller than the solid separator can remove, also tends to speed up separation of the oily and non-oily phases.

Other features and advantages of the present invention will appear from the following description in which the preferred embodiment has been set forth in detail in conjunction with the accompanying drawing.

DETAILED DESCRIPTION OF THE PREFERRED EMBODIMENT

Figure 1:
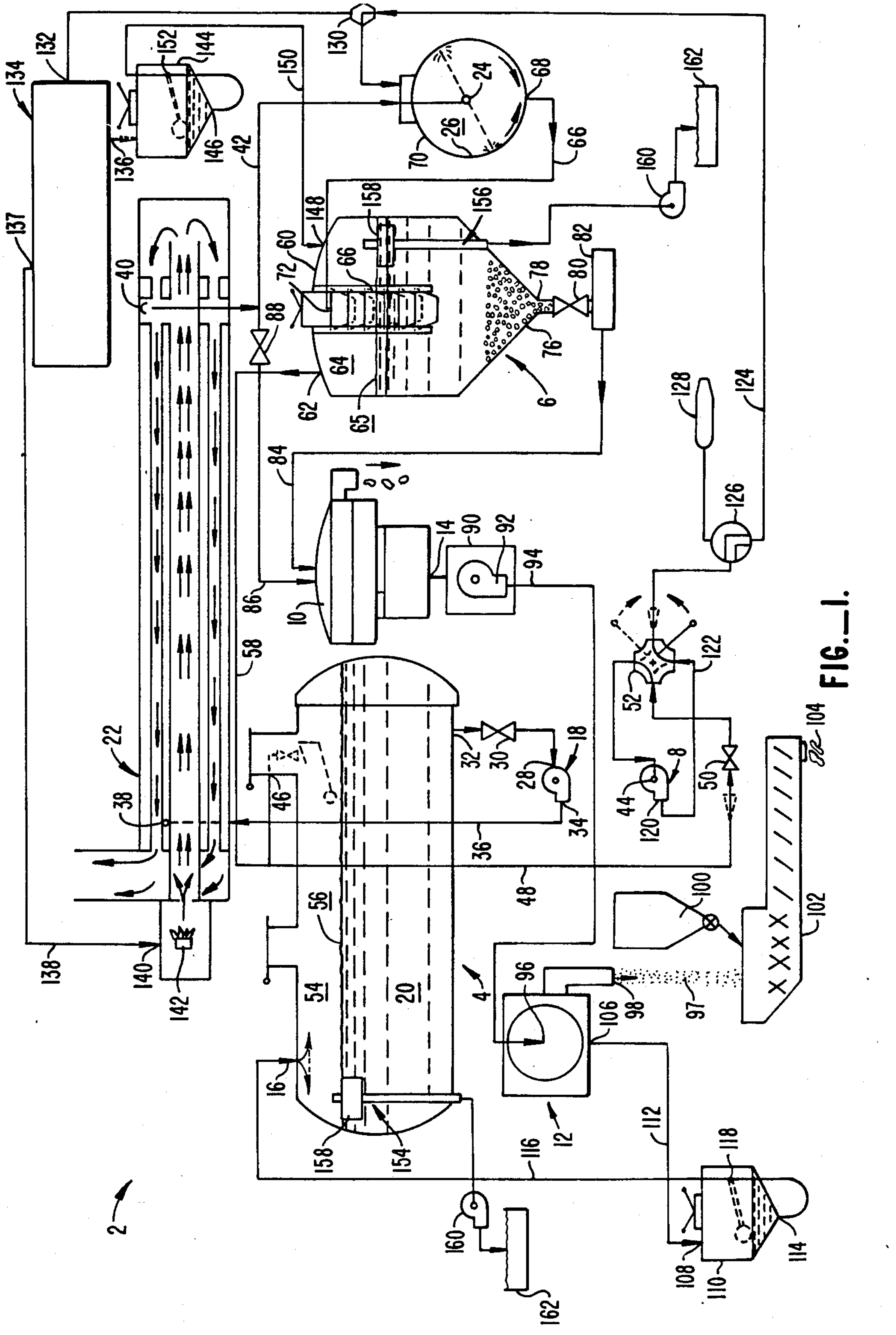
FIG. 1 is a schematic diagram of a sludge remover and processor made according to the invention.

Turning now to FIG. 1, a sludge remover and processor 2 is shown and includes a first, cleaning liquid vessel 4, a second, phase separation vessel 6, a vacuum pump 8 coupled to first and second vessels 4, 6, a solids separator 10 downstream from second vessel 6, a centrifuge 12 between a liquid outlet 14 of solids separator 10 and a suction inlet 16 in first vessel 4. A liquid pump 18 pumps cleaning liquid 20 from first vessel 4 through a heat exchanger 22 and to a spray nozzle 24 to spray heated cleaning liquid against a surface 26 to be cleaned.

An inlet 28 of pressure pump 18 is connected through a valve 30 to a liquid outlet 32 in first vessel 4. A pump outlet 34 is connected by a pipe 36 to a heat exchanger inlet 38. The cleaning liquid 20 is heated as it passes through heat exchanger 22 to about 180° F. Cleaning liquid 20 exits heat exchanger outlet 40 whereupon it passes along a high pressure spray line 42 for discharge from spray nozzle 24.

A vacuum inlet 44 of vacuum pump 8 is connected to a vacuum outlet 46 of first vessel 4 through a pipe 48. A valve 50 and a four-way valve 52 are positioned along pipe 48 for control of fluid flow therethrough. When moved to the dashed line position, valve 52 allows vessel 4 to be pressurized, which can be useful when cleaning vessel 4. During normal operation pump 8 produces a partial vacuum in a space 54 above a free surface 56 of cleaning liquid 20. A pipe 58 is connected between pipe 48 and the top 60 of second vessel 6 at a vacuum outlet 62. Thus, pump 8 also draws a partial vacuum within an upper region 64 above a free surface 65 of the liquid within second vessel 6. In lieu of connecting pipe 58 to pipe 48, pipe 58 could also be coupled to first vessel 4 to communicate with space 54 above free surface 56. This would also draw a partial vacuum within upper region 64.

Cleaning liquid and dislodged material, often a sludge-like combination of oil, water, cleaning agents and various solids, are sucked into second vessel 6 through a return line 66 connected at one end to a drain 68 in dirty tank 70. The other end 72 is positioned centrally above a phase separator 74 similar to that shown in U.S. Pat. Application Ser. No. 657,284, filed Oct. 2, 1984. The solid material settles at the coned bottom 76 of vessel 6. There a mixture of solids and liquid flow out of a solids/liquid outlet 78 through a valve 80 and into a progressive cavity pump 82. Pump 82 pumps the solids and liquids mixture through a discharge pipe 84 and into solids separator 10. Solids separator 10 separates solid materials from liquid materials so that the solids can be disposed of. In some cases it is desired to add extra heated wash water to solids separator 10 which can be accomplish through a pipe 86 connected through a valve 88 to high pressure spray line 42.

Liquid flows from solids separator 10 through liquid outlet 14 into a collector tank 90 where it is pumped by a forwarding pump 92 through a pipe 94 to a centrifuge inlet 96 of centrifuge 12. Centrifuge 12 separates the finely divided solids 97 that are not separable by solids separator 10 and discharges them through a solids outlet 98. The discharged solids are combined with a bulk solidification medium 100 in a blender/extruder 102 for discharge as disposal cake 104.

Centrifuge 12 also includes a centrifuge liquid outlet 106 connected to an inlet 108 of a liquid collector pot 110 through a line 112. Pot 110 has a liquid outlet 114 which is connected to suction inlet 16 by a pipe 116. Pot 110 includes a liquid level shut off valve 118 positioned along pipe 116 which closes whenever the liquid within pot 110 goes below a chosen level.

Vacuum pump 8 exhausts through its outlet 120 through a line 122 and through four-way valve 52. A vacuum discharge line 124 is connected to four-way valve 52. A bypass valve 126 is placed along line 124 to allow the user to either direct the exhaust from vacuum pump 8 through a muffler 128 and into the atmosphere instead of continuing along line 124. A diverter valve 130 is positioned along line 124 downstream of valve 126 and is used to allow the user to selectively divert the vacuum pump exhaust back into dirty tank 70. This would, of course, be used only when tank 70 is a sealed or substantially sealed vessel to permit sludge remover and processor 2 to be used as a closed system.

Line 124 continues from valve 130 to a scrubber inlet 132 of a conventional scrubber assembly 134. Assembly 134 includes a liquid outlet 136 and a scrubber gas outlet 137. Scrubber assembly 134 may consist of a single unit or a number of units chosen according to the components desired to be removed from the exhaust. Preferably assembly 134 is of a type which condenses and collects condensable materials so that the gases left can be directed along a line 138 to a recycle air inlet 140 where it is introduced into the combustion air for burner 142. The very high temperature produced by burner 142 incinerates many of the gaseous components of the exhaust from outlet 137 to keep them from entering into the atmosphere.

Condensate outlet 136 is connected to a liquid collector 144 having a liquid outlet 146 connected to a suction inlet 148 in second vessel 6 by line 150. Line 150 has a liquid level shut off valve 152 positioned along its length. Once the liquid level within collector 144 is sufficiently high to open valve 152, the partial vacuum within region 64 of vessel 6 draws the liquid in collector 144 into vessel 6.

Since the sludge-like material often removed from dirty tank 70 may contain oily components, it is often desired to have the oily components separate out from the non-oily liquid components. This oily component separation is aided by keeping space 54 and upper region 64 at a partial vacuum and by keeping cleaning liquid 20 in vessels 4, 6 at an elevated temperature of about 140° F. The reduced pressure permits tiny bubbles to form within cleaning liquid 20 at a lower temperature than would be required if the vessels 4, 6 were kept at the ambient atmospheric pressure. The bubbles which rise to free surfaces 56, 65 aid phase separation of the oily components from the non-oily components. Second, treating the liquid from solid separator 10 by centrifuge 12, primarily to remove fine solid particles, also tends to aid separtion of the oily and non-oily components within vessel 4.

To remove the oily components which collect along free surfaces 56, 65, oil skimmers 154, 156 are used within vessels 4, 6. Oil is pumped from the floating heads 158 of skimmers 154, 156 by pumps 160 into oil collectors 162 for disposal or preferably reprocessing.

In use, sludge remover and processor 2 is preferably mounted on one or more vehicles so to be mobile and movable to the tank, vessel, vat or other surface to be cleaned. Assuming a substantially sealed dirty tank 70 is to be cleaned, a spray nozzle 24 is positioned within the tank. Valve 30 is opened and pump 18 is powered to force cleaning liquid 20 through heat exchanger 22 where it is heated by burner 142. After exiting heat exchanger 22 at about 180° F., the heated cleaning liquid is sprayed against dirty surfaces 26 of tank 70 and collects at drain 68. Simultaneously, vacuum pump 8 is actuated with four-way valve 52 in the solid line position of FIG. 1 with valve 50 being open. This creates a partial vacuum within space 54 and upper region 64 so that the liquid and dislodged materials are sucked from dirty tank 70 into vessel 6 through return line 66. Once vessel 6 begins to fill, valve 80 is opened and pump 82 is actuated to pull liquid and solid material from solids/liquids outlet 78 of vessel 6 and into solid separator 10. Valve 88 can be opened so that a small amount of the heated cleaning liquid is introduced into solid separator 10 to aid separation of the solids and liquids. Liquid is pumped from collector tank 90 by pump 92 to centrifuge 12 which separates the liquid, which passes through liquid outlet 106, and relatively fine solids 97, which are combined with bulk solidification medium 100 in blender/extruder 102. The liquid from centrifuge 12 flows into liquid collector 110. When collector 110 is filled sufficiently to open valve 118, the liquid inside is sucked back into vessel 4 through suction inlet 16. Oil which collects along the free surfaces 56, 65 in vessels 4, 6 is removed by oil skimmers 154, 156. Exhaust gases from vacuum pump 8 can be either recycled back into tank 70 or processed through assembly 134 depending on the content of the exhaust gases. In cases where no noxious or poisonous gases or vapors are present in the exhaust from vacuum pump 8, pump 8 may be exhausted straight into the atmosphere through muffler 128.

Modification and variation can be made to the disclosed embodiment without departing from the subject of the invention as defined in the following claims. For example, instead of dirty tank 70, an open topped vat or other dirty surface can also be cleaned in which case one or more suction heads would be connected to the end of return line 66 to withdraw cleaning liquid and dislodged contaminants.

I claim:

1. A method for enhancing oil collection from a liquid mixture of oily and non-oily phases comprising the following steps:

subjecting the mixture to a partial vacuum at a first collection point to aid separation of the liquid mixture into an oil layer and remainder layer by the formation of bubbles in the liquid mixture;

removing oily phases from the oil layer at the first collection point;

directing remainder liquid from the remainder layer to a centrifuge;

centrifuging the remainder liquid to remove any solids therefrom and to aid subsequent oil separation of the centrifuged liquid;

passing centrifuged liquid from the centrifuge to a second collection point;

subjecting the centrifuged liquid at the second collection point to a second partial vacuum to further aid separation of the centrifuged liquid into a second oil layer and a second remainder layer by the formation of bubbles in the liquid mixture; and removing oily phases from the second oil layer at the second collection point.

2. The method of claim 1 further comprising the steps of elevating the temperature of the mixture to further aid separation of the oily and non-oily phases.

3. The method of claim 1 further comprising the step of blending the solids from the centrifuge with a bulk solidification medium to form solid disposal cake.

4. The method fo claim 1 wherein the subjecting step is carried out by a vacuum pump having a vacuum outlet through which exhaust is discharged.

5. The method of claim 4 further comprising scrubbing the exhaust from the vacuum pump to remove a chosen substance from the exhaust.

6. The method claim 5 further comprising the step of incinerating the scrubbed exhaust.

7. A sludge remover and processor system, of the type using a recycled cleaning liquid, especially suited for aiding the separation of oily and non-oily phases in a mixture of cleaning liquid and dislodged contaminants, comprising:

a first vessel adapted to hold the cleaning liquid, said liquid having a free surface, the first vessel having a liquid outlet below the free surface and an inlet above the surface;

means for pumping said cleaning liquid from the liquid outlet through a first line;

means for directing said cleaning liquid from said first line onto a surface being cleaned;

a second vessel having upper and lower regions;

a return line, having an inner end fluidly connected to said upper region of said second vessel and an outer end associated with the surface being cleaned, for removing dislodged contaminants and cleaning liquid from the surface being cleaned, the return line directing the dislodged contaminants and cleaning liquid to the second vessel;

means, communicating with the upper region of said second vessel, for creating a partial vacuum in said upper region so to aid the formation of tiny bubbles in the mixture of dislodged contaminants and cleaning liquid to aid separation of oily and non-oily phases in said mixture;

solids separator means having an inlet fluidly coupled to the lower region of said second vessel, said solids separator means adapted to separate solids from liquid and to direct the separated liquid to a liquid outlet of said solids separator means;

a centrifuge, having a centrifuge inlet, a centrifuge liquid outlet and a centrifuge solids outlet, the centrifuge acting to speed up subsequent separation of oily and non-oily substance and acting to remove finely divided solids not removable by the solids separator means for discharge through said centrifuge solids outlet; and means for directing liquid from the centrifuge liquid outlet to the inlet of the first vessel.

8. The system of claim 7 wherein the partial vacuum creating means communicates with the upper region of the first vessel to create a partial vacuum therein.

9. The system of claim 7 including means for heating said cleaning liquid prior to passing from said first mentioned directing means.

10. The system of claim 7 further comprising a solids/liquid pump means for pumping solids and liquid from said solids/liquid outlet to said inlet of said solids separator means.

11. The system of claim 7 further comprising a pump between the solid separator means liquid outlet and the centrifuge inlet.

12. The system of claim 7 further comprising a first liquid collector between the centrifuge liquid outlet and the first vessel inlet.

13. The system of claim 7 further comprising a blender/extruder means, coupled to the centrifuge solids output, for transforming solids from the centrifuge solids outlet into solid disposal cake incorporating a bulk solidification medium.

14. The system of claim 7 wherein the vacuum creating means includes a vacuum pump having an inlet and an outlet and further comprising a vacuum discharge line coupled to the vacuum pump outlet at one vacuum discharge line end.

15. The system of claim 14 further comprising an exhaust scrubber, having an inlet, a gas outlet and a liquid outlet, positioned along the vacuum discharge line for removing chosen substances from the exhaust flowing along the vacuum discharge line.

16. The system of claim 15 further comprising a burner with a recycle air inlet fluidly coupled to the scrubber gas outlet so that substances not removed by the scrubber are fed to the burner for burning.

17. The system of claim 16 wherein the burner is a part of a heat exchanger means for heating the cleaning liquid passing through the first line.

18. The system of claim 15 further comprising a second liquid collector having an inlet fluidly coupled to the scrubber liquid outlet an outlet fluidly coupled to the second vessel.

19. The system of claim 7 further comprising a surface skimmer in the second vessel for removing surface liquids from the second vessel.

20. The system of claim 19 further comprising a second surface skimmer in the first vessel for removing surface liquids from the first vessel.

21. A sludge remover and processor system, of the type using a recycled cleaning liquid, especially suited for aiding the separation of oily and non-oily phases in a mixture of cleaning liquid and dislodged contaminants comprising:

a first vessel adapted to hold the cleaning liquid, said liquid having a free surface, the first vessel having a liquid outlet below the free surface and an inlet above the surface;

means for pumping said cleaning liquid from the liquid outlet through a first line;

means for heating said liquid passing through said first line;

means for directing said cleaning liquid from said first line onto a surface being cleaned;

a second vessel having upper and lower regions;

a return line, having an inner end fluidly connected to said upper region of said second vessel and an outer end at a low point associated with the surface being cleaned, for removing dislodged contaminants and cleaning liquid from the surface being cleaned, the return line directing the dislodged contaminants and cleaning liquid to the second vessel;

a vacuum pump having an outlet connected to a vacuum discharge line and an inlet communicating with the upper regions of said first and second vessel for creating partial vacuums in said upper regions of said first and second vessels, said partial vacuum created in said second vessel upper region by the partial vacuum creating means tending to suck the cleaning liquid and dislodged contaminants into said second vessel, said partial vacuums aiding the formation of tiny bubbles in the mixtures of dislodged contaminants and cleaning liquid to aid separation of oily and non-oily phases in said mixtures;

an exhaust scrubber, having an inlet, a gas outlet and a liquid outlet, positioned along the vacuum discharge line for removing chosen substances from the exhaust flowing along the vacuum discharge line;

solids separator means having an inlet fluidly coupled to the lower region of said second vessel, said solids separator means adapted to separate solids from liquid and to direct the separated liquid to a liquid outlet of said solids separator means;

a centrifuge, having a centrifuge inlet, a centrifuge liquid outlet and a centrifuge solids outlet, the centrifuge acting to speed up subsequent separation of oily and non-oily substance and acting to remove finely divided solids not removable by the solids separator means for discharge through said centrifuge solids outlet;

a blender/extruder, coupled to the centrifuge solids output, for transforming the finely divided solids from the centrifuge solids outlet into solid disposal cake incorporating a bulk solidifaction medium; and means for directing liquid from the centrifuge liquid outlet to the inlet of the first vessel.

* * * * *